I. A. SINGER.
Mats for Bird-Cages.
No. 152,526.   Patented June 30, 1874.
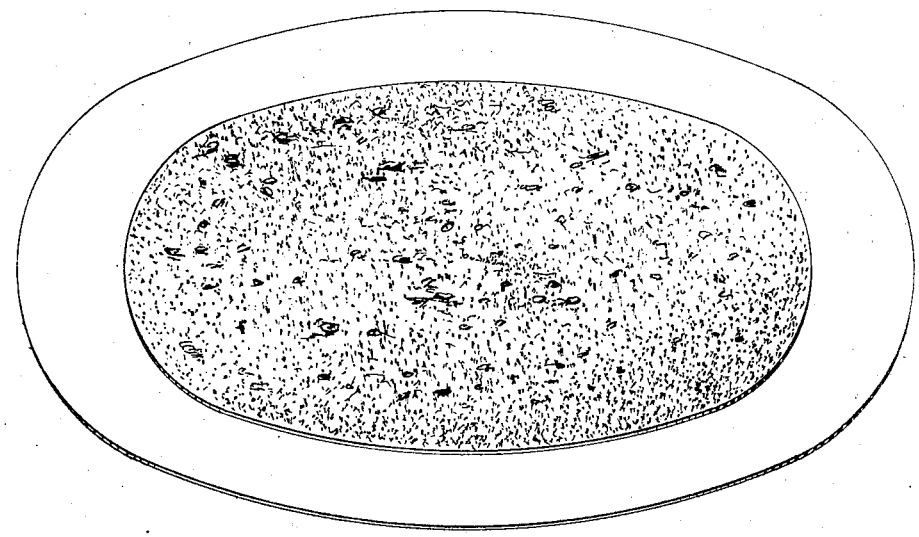
Witnesses:
Charles A Singer
Sarah J Singer
Inventor:
Isaac A Singer

UNITED STATES PATENT OFFICE.

ISAAC A. SINGER, OF NEW YORK, N. Y.

IMPROVEMENT IN MATS FOR BIRD-CAGES.

Specification forming part of Letters Patent No. 152,526, dated June 30, 1874; application filed May 6, 1874.

*To all whom it may concern:*

Be it known that I, ISAAC A. SINGER, of the city, county, and State of New York, have invented certain Improvements in Mats for Bird-Cages, of which the following is a specification:

My invention relates to mats to be placed in the bottoms of cages for birds; and consists in certain improvements upon the "Improvement in Bird-Cage Mats," for which Letters Patent of the United States were granted to me April 4, 1871.

Heretofore, in the manufacture of cage-mats, farinaceous paste has been used as the adhesive agent. This paste, as its name implies, is made from wheat or rice flour, and is liable to sour, and if kept over night will spoil, and thus entail a loss. Besides, farinaceous paste is acted on by the temperature and moisture of the natural air, and will lose its tenacity, sour, mold, and develop larvæ. Bird-fanciers, and other persons well informed upon the subject, have given as their carefully-arrived-at opinion that flour paste is injurious to canary birds.

The above objections led me to seek for an edible adhesive agent that did not possess the injurious qualities of farinaceous paste, and after a series of experiments, extending over three years, I have at last found an edible agent for attaching sand, gravel, or bird food to paper or other material, one that will preserve the food, that will withstand the action of the natural temperature and natural moisture of the air, and will not sour nor mold, like the farinaceous paste heretofore alluded to. The edible adhesive agent which I have found to possess all the requisite qualities for a cage-mat, and which I have tested and proved by careful experiments, is gum-arabic.

My improvement consists in the combination, with paper or cloth, of sand or gravel, attached thereto by means of an edible gum, substantially as hereinafter set forth. Second, the combination, with cloth or paper, of bird-seed or other food, attached thereto by means of an edible gum, and either with or without the admixture of sand or gravel, for the purpose of furnishing an additional inducement to the birds to pick and scratch upon the mat, substantially as hereinafter set forth; third, the combination, with gravel or food, and an edible gum, of cloth, either felted or woven, and either with or without paper attached thereto, for the purpose of preventing the bird from picking the mat to pieces, substantially as hereinafter set forth.

In the preparation of my improved mat for bird-cages, I prefer to use gum-arabic dissolved in water, in the proportion in bulk of three (3) parts of water to one (1) part of gum-arabic. I cut the papers or cloths to suit the size of cage they are intended to be used in, and then apply to the surface of the papers or cloths so cut a coating of the liquid gum. I then cover the gummed surface of the papers or cloths with gravel or sand, and by throwing off the surplus gravel or sand an even coating of gravel or sand is retained on the surface of the papers or cloths. If seed or other food is required to be attached, either with or without gravel, then I mix in a vessel the food, seed, gravel, and a little liquid gum, and spread this mixture upon the gummed surface of the papers or cloths, and thus give to the food a coating of gum, which protects it from the action of the natural temperature and moisture of the atmosphere.

I do not claim a bird-cage mat having sand, or gravel, or bird-food attached to the surface thereof, irrespective of the means by which the attachment is effected; but I do claim as my invention and desire to secure by Letters Patent—

1. The combination, in a mat for bird-cages, of cloth or paper, sand or gravel, either mixed with bird-food or not, and an edible gum, substantially as hereinbefore set forth.

2. The combination, in a mat for bird-cages, of felt or woven cloth, either gummed upon paper or not, sand or gravel, or bird-seed or other food, and an edible gum, substantially as hereinbefore set forth.

ISAAC A. SINGER.

Witnesses:
JAMES F. THOMSON,
G. S. STARL.